United States Patent [19]

Squier

[11] 4,405,666
[45] Sep. 20, 1983

[54] FILM LAMINATE FOOD WRAP AND FOOD POUCH THEREFROM

[75] Inventor: Joann H. Squier, Holcomb, N.Y.

[73] Assignee: Mobil Oil Corporation, New York, N.Y.

[21] Appl. No.: 364,747

[22] Filed: Apr. 2, 1982

[51] Int. Cl.$^3$ .............................................. B32B 27/08
[52] U.S. Cl. ........................................ 428/35; 428/36; 428/349; 428/516; 428/520; 156/334; 524/377
[58] Field of Search ............... 428/515, 516, 520, 522, 428/910, 35, 36, 347, 349; 156/334; 524/376, 377

[56] References Cited

U.S. PATENT DOCUMENTS

| | | | |
|---|---|---|---|
| 2,425,755 | 8/1947 | Roberts et al. | 568/618 |
| 3,220,917 | 12/1965 | Lowes, Jr. | 524/377 |
| 3,453,173 | 7/1969 | Isley et al. | 428/424.17 |
| 3,837,994 | 9/1974 | Flanagen et al. | 156/334 |

FOREIGN PATENT DOCUMENTS 2653541 4/1980 Fed. Rep. of Germany ...... 428/516

OTHER PUBLICATIONS

*Adhesive Handbook,* Shields, Second Edition, pp. 230–231.

*Primary Examiner*—Marion McCamish
*Assistant Examiner*—Beverly K. Johnson
*Attorney, Agent, or Firm*—Michael G. Gilman; James F. Powers, Jr.; James P. O'Sullivan, Sr.

[57] ABSTRACT

A flexible film laminate of (a) a polyacrylonitrile film containing a heterized ethylene oxide-propylene oxide copolymer; (b) contacting said film with an adhesive combination layer of a styrene-butadiene block copolymer and a terpolymer of 1,3-pentadiene, a monocyclic terpene and alpha methylstyrene; and (c) a second polyacrylonitrile film or a heat-sealable polyolefin film contacting said adhesive layer; a product pouch made therefrom; and a method of forming said laminate.

17 Claims, No Drawings

FILM LAMINATE FOOD WRAP AND FOOD POUCH THEREFROM

BACKGROUND OF THE INVENTION

The present invention relates to a flexible, boil resistant film laminate and to packages, for example, retortable food pouches fabricated therefrom.

Certain packaging applications, for example, retort packages, require that the packaging material constitute a good barrier to the passage of oxygen and moisture vapor. In addition, the packaging of certain foods require that a minimum of oxygen or air are transmitted to the contents. Cheese is one food product which should be packaged to the exclusion of oxygen.

Oriented polyacrylonitrile (PAN) film has excellent oxygen barrier properties. Its moisture barrier properties, however, are less than desirable for certain packaging purposes. Furthermore, it is not sealable to itself. Both deficiencies can be overcome by applying to one surface of the PAN a layer of a thermoplastic material having good moisture barrier properties. For some purposes it is desirable to bond the PAN film to itself. It is necessary, therefore, to consider the imposition of an adhesive or bonding system between either two layers of PAN or a layer of PAN and a thermoplastic moisture barrier film. By providing an effective adhesive bond between such films the result will be satisfying a need that has developed in the food packaging industry. In recent years, the industry has shown intense interest in the concept of pouch-packaged foods which, among other advantages, do not require freezing for their preservation and can therefore dispense with costly and energy intensive refrigerated transportation and storage facilities. Much effort has gone into the development of a flexible food pouch which not only can withstand the rigors of sterilization and later reheating, e.g., microwave heating, and provide various properties which are sufficient to adequately protect the contents during storage, but which also employ materials which are toxicologically safe.

In accordance with U.S. Pat. No. 3,453,173, a polyolefin-polyacrylonitrile laminate, which is said to possess superior heat-sealed strength and excellent barrier properties to the transmission of gases and is adaptable for the construction of food containers, is prepared by bringing the polyolefin surface and the polyacrylonitrile surface together and adhering them to each other through an adhesive. Either or both surfaces can be pre-treated in some manner in an effort to make them more adherent, e.g., by treatment with a gaseous mixture of boron trifluoride, as described in British Pat. No. 834,196; by flame treatment or by treatment by corona discharge, as described in U.S. Pat. No. 2,632,921. Among the adhesives employed in the manufacture of the laminate is an ethylene vinylacetate copolymer described in U.S. Pat. No. 2,200,429. Because the conditions of prepartion and the adhesive contemplated are not conducive to the formation of primary valence bonding, the interlaminar adhesion in boiling water would not be expected to be strong. Resort also has been had to metalizing the PAN film in order to employ the metal layer as an effective surface through which adhesion can be accomplished to the water vapor barrier film.

It is an object of the present invention to present polyacrylonitrile film laminates or composites of two or more PAN layers bonded together with a unique and effective bonding system.

It is an object of the present invention to present polyacrylonitrile film laminates or composites of PAN and a thermoplastic moisture barrier layer bonded together with a unique and effective bonding system.

It is a further object to present a food or product pouch or tube made from said laminate.

It is yet another object of the invention to present a method for improving the bond strength between films of the type described above.

SUMMARY OF THE INVENTION

In accordance with the present invention, a flexible film laminate adaptable for use in the packaging of a commodity and in particular food, is provided which comprises:

(a) an oriented polyacrylonitrile film containing an adhesion promoting proportion of a liquid heterized ethylene oxide-propylene oxide copolymer prepared by reacting said oxides with at least one monohydric alcohol active hydrogen compound initiator having from about 1 to about 10 aliphatic carbon atoms;

(b) an adhesive layer contacting said polyacrylonitrile film, said adhesive layer being a combination of (1) a styrene-butadiene block copolymer having a monomer parts by weight ratio of from about 1:3 to about 3:1 and (2) a random terpolymer of from about 30 to about 40 parts by weight of 1,3-pentadiene; about 30 to about 40 parts by weight of a monocyclic terpene and from about 25 to about 35 parts by weight of alpha methylstyrene, said combination consisting essentially of from about 1 to about 3 parts by weight of the block copolymer to from about 3 to about 1 part by weight of the terpolymer; and (c) either a second oriented polyacrylonitrile film containing said heterized copolymer or a heat-sealable polyolefin, contacting said adhesive layer.

The process for adhesively bonding together two or more polyacrylonitrile films or a polyacrylonitrile film and a heat-sealable polyolefin film comprises: incorporating into the polyacrylonitrile film an adhesion promoting proportion of a liquid heterized ethylene oxide-propylene oxide copolymer prepared by reacting said oxides with at least one monohydric alcohol active hydrogen compound initiator having from about 1 to about 10 carbon atoms and applying pressure to the film surfaces having an interposed layer of a composition comprising a combination of (1) a styrene-butadiene block copolymer having a monomer parts by weight ratio of from about 1:3 to about 3:1 and (2) a random terpolymer of from about 30 to about 40 parts by weight of 1,3-pentadiene; about 30 to about 40 parts by weight of a monocyclic terpene and from about 25 to about 35 parts by weight of alpha methylstyrene, said combination consisting essentially of from about 1 to about 3 parts by weight of the block copolymer to from about 3 to about 1 part by weight of the terpolymer.

DETAILED DESCRIPTION OF THE INVENTION

The polyacrylonitrile film of the present invention comprises a high nitrile addition polymer containing at least 80% acrylonitrile repeating units. Flat PAN film may be solvent cast according to the process of U.S. Pat. No. 4,066,731 (which is incorporated herein by reference) wherein acrylonitrile homopolymer or interpolymer is cast onto a rotating drum from a sheeting dye and coagulated as a self-supporting film. Organic solvent in said film, such as dimethyl sulfoxide, can be exchanged therefrom by a water bath to obtain an aquagel film typically containing 40 to 60% water integrally bound in the molecular interstices or dispersed in the orientable polymer matrix. A tubular PAN film can be extruded and water-coagulated, if desired, and the unoriented film can be slit and fed to the treatment and orientation units as a flat strip. Aqueous PAN film can also be made by melt-extrusion of a high temperature polymer hydrate in a known manner.

The preferred PAN feedstock is an addition polymer material containing sufficient water to be stretched at low temperatures. Acrylonitrile polymers containing at least 5% $H_2O$, preferably aquagels, containing about 40 to 60% $H_2O$, are excellent film substrates for use herein. The present system is especially valuable for treating PAN homopolymer such as du Pont Type A resin. Homopolymer PAN, copolymers and interpolymers with hydrophilic ethylenically-unsaturated monomers, such as acrylic acid and esters, etc., may be adapted to the novel process. Typical high-nitrile polymers are disclosed in U.S. Pat. Nos. 2,585,444; 3,873,508; 3,896,204; 3,984,601; and 4,053,442, incorporated herein by reference.

Incorporated into the polyacrylonitrile film as a plasticizer and as an adhesion promoting agent is the above described liquid polyether. These materials are water soluble or water miscible and have an average molecular weight of from about 500 to 5000 and a Saybolt viscosity at 100° F. of from about 85 to about 5200 seconds. The preferred average molecular weight is from about 800 to about 4600 and a preferred Saybolt viscosity at 100° F. is from about 160 to about 5100 seconds. A particularly preferred average molecular weight is from about 800 to about 2000. The polyether is present in the film in a plasticizing and adhesion promoting proportion. This amount should be at least 1% of the PAN polymer. More specifically, the polyether is present in from about 5 to about 20 weight percent of the PAN polymer.

A process for forming the PAN film having the liquid or polyether incorporated therein comprises the steps of: (a) maintaining a predetermined concentration, in an aqueous solution, of said liquid polyether, said polyether having been prepared generally as indicated above: (b) contacting continuous polyacrylonitrile aquagel film with said solution, thereby including said polyether into the aquagel; (c) sequentially or simultaneously stretching the polyether-aquagel-PAN film system to orient the polyacrylonitrile film; and (d) drying the oriented film to at least substantially remove water and yield the polyether imbibed film.

This process is particularly adaptable for imbibing PAN with the subject water-miscible polyether by maintaining a predetermined concentration of the polyether in the aqueous bath under steady state process conditions. The continuous polymeric aquagel film is passed through the bath at substantially constant water content. The polyether impregnant is thereby coated onto the film. The impregnant may be added to the aqueous bath in a steady stream comprised essentially of the polyether. The polyether can be metered to the bath substantially undiluted and additional water can be input to the process as needed. It is to be understood that the polyether alone, or as a water solution, can be applied to the PAN film in any fashion, for example, by spray, roller, brush, etc., application.

The polyethers contemplated herein have been known since at least the 1940's. They are essentially mixtures of monohydroxy alcohols which may be obtained by the addition to one or more monohydroxy aliphatic alcohols, of a mixture of alkylene oxides, containing ethylene oxide and 1,2-propylene oxide, in an oxide ratio of from about 75-25 to 10-90 ethylene oxide to 1,2-propylene oxide. Stated otherwise, the oxide ratio can be from ⅑ part to 9 parts propylene oxide per part of ethylene oxide by weight. These ratios are qualified by the molecular weight range mentioned above and the necessity for at least substantial water solubility or miscibility.

The reaction which takes place between the alcohol or alcohols and the ethylene oxide and the 1,2-propylene oxide, seems to be a simple addition reaction wherein the alkylene oxide molecules undergo conversion to the corresponding oxyalkylene radicals as illustrated for any given molecule by the following general equation:

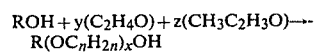

$$ROH + y(C_2H_4O) + z(CH_3C_2H_3O) \rightarrow R(OC_nH_{2n})_xOH$$

wherein ROH is one or more aliphatic monohydroxy alcohols; x and z represent the mols of ethylene oxide and 1,2-propylene oxide, respectively; n is both 2 and 3 in a single molecule, the total number of times n has a value of 2 can be equal to y and the total number of times n has a value of 3 can be equal to z; and x is the total number of such oxyalkylene groups, being equal to $y+z$.

From such properties and the average molecular weight, refractive index, density, viscosity, rate of change of viscosity with change in temperature, as well as theoretical considerations, it appears that these products are complex mixtures of monohydroxy polyoxyalkylene aliphatic monoethers having polyoxyalkylene chains of different lengths in different internal configurations with the hydroxyl group appearing at one end of the chain and the aliphatic group of the starting alcohol or starting alcohols at the other, and containing in a single molecule, both the oxyethylene group and the oxy-1-2,propylene group. These materials have been referred to as mixtures of monohydroxy heterized oxyethylene oxy-1,2-propylene aliphatic monoethers. By the term "heterized", it is meant that the monoethers vary in internal configuration from molecule to molecule, such variation arising out of a randomness of the distribution of the oxyethylene and the oxy-1,2-propylene groups therein, for instance, from the concurrent reaction of ethylene oxide and 1,2-propylene oxide with the aliphatic monohydroxy alcohol or alcohols. By the use of the term "heterized" is not meant to exclude the presence of relatively small blocks of polyethylene oxide groups and with relatively small blocks of polyoxy-1,2-propylene oxide groups. These materials have also been generically referred to as polyalkoxylated polyethers apparently when a mixed aliphatic alcohol initiator is employed in the formation thereof.

For more detailed exposition of the materials contemplated herein and the process of preparing the same, reference is made to U.S. Pat. No. 2,425,755 and copending application Ser. No. 331,427 filed Dec. 16, 1981 which are incorporated herein by reference. Particularly preferred for use herein as an adhesion enhancer and plasticizer for the PAN are the mixed polyethers formed with the intiator, butyl alcohol, or a mixture of ethyl alcohol and butyl alcohol.

As indicated above the adhesive system of the present invention can be employed to bond polyacrylonitrile film to another polyacrylonitrile film or to a thermoplastic heat-sealable polymer film. Particularly preferred are polyolefins. The polyolefins which are useful herein include the film-forming homopolymers and copolymers formed by the polymerization of one or more $C_2$–$C_8$ alpha-olefins, for example ethylene, propylene, butene-1, pentene-1, hexene-1, heptene-1, octene-1, etc. The useful polyolefins also include film-forming copolymers of one or more of the alpha-olefins, copolymerized with up to 20 weight percent total, and preferably not more than 5 weight percent total of one or more monomers copolymerizable with the alpha-olefin. Examples of such monomers include, carbon monoxide; sulfur dioxide, acrylic acid or/and acrylate ester such as methyl acrylate, amyl acrylate, hexyl acrylate, cyclohexyl acrylate, and the like; methacrylic acid or a methacrylate ester, such as methyl methacrylate, ethyl methacrylate, propyl methacrylate, butyl methacrylate, amyl methacrylate, and the like; vinyl acetic acid or a vinyl ester such as vinyl formate, vinyl acetate, vinyl propionate, vinyl butiorate, vinyl benzoate, isopropynol acetate and the like.

Procedures for the polymerization of alpha olefins and the copolymerization of alpha olefins with other monomers such as those recited herein are well-known and do not constitute a part of this invention. The polyolefins which are useful herein can be a atactic, isotactic, syndiotactic, crystalline or amorphous or a combination of any of the foregoing. The preferred polyolefin films are the homopolymers and the copolymers of ethylene and propylene. A particularly preferred polyolefin film is a random copolymer of propylene with a minor amount of ethylene (commercially available from Exxon Corporation as EX-24). Good adhesion can be obtained without subjecting the films of the present invention to a surface treatment, however, better adhesion is obtained by subjecting the polyolefin films to corona discharge and/or by other equivalent means prior to application of the adhesive.

The adhesive system of the present invention not only must be an effective adhesive to the PAN film but under the conditions of the present invention it also must be an effective bonding system to the thermoplastic moisture barrier film.

For reasons not completely understood, the presence of the heterized polyether in the PAN film causes a significantly stronger bond at the interface between the PAN and the adhesive system than would be possible if the heterized polyether were not present in the PAN.

The adhesive system is a combination of a commercially available product sold under the name Kraton 1000 series products (Shell Chemical Company, Polymers Division) and a second component. One material of this series, Kraton 1102 is a styrene-butadiene block copolymer having the following properties determined at about 23° C. on films cast from a toluene solution: tensile strength, psi 4600; 300% Modulus, psi 400; Elongation %, 880; Hardness, Shore A 62; Angle Tear Strength-Die C, pli 190; Specific Gravity 0.94; and Solution Viscosity-25% w, cps from a toluene solution, 1200.

The second component of this adhesive combination is a resinous random terpolymer which contains from about 30 to about 40 parts by weight of 1,3-pentadiene; about 30 to about 40 parts by weight of a monocyclic terpene; and about 25 to about 35 parts by weight of alpha methylstyrene. Although a preferred monocyclic terpene for employment in the present combination is beta-phellandrene, other monocyclic terpenes, or mixtures thereof, may be employed. These include dipentene, alpha-terpinene, beta-terpinene, alpha-phellandrene, gama-terpinene, terpinolene, sylvestrene, origanene, the pyronenes and the like.

It is preferred that the terpolymer additive have the following properties:
Melting point range (ring and ball) 75°–125° C.;
Specific gravity 1.08–0.90;
Bromine number 6–14;
Iodine number 79;
Acid value, less than 1;
Saponification number, less than 1;
Decomposition temperature (in air) 300° C.;
Color (in 50% toluene solution; Gardner 6; and
Viscosity (in toluene) 70%.

A particularly preferred random terpolymer is prepared by polymerizing a feedstream containing 37.5% by weight 1,3-pentadiene, 37.5% by weight beta-phellandrene, and 25% by weight of alpha-methylstyrene in a toluene diluent in the presence of an aluminum chloride catalyst. The resulting terpolymer contains 34.0 parts by weight of 1,3-pentadiene, 36.5 parts of beta-phellandrene and 29.5 parts by weight of alpha methylstyrene. This material has a molecular weight (weight average) of 1880, a bromine number of 14, an iodine number of 79, a glass transition temperature of 38° C., a viscosity in toluene, f to g, of 70% and a decomposition temperature (in air) of 300° C.

The individual films comprising the laminate described herein can be prepared in widely varying thicknesses, for example, from about 0.1 mils to about 10 mils and preferably from about 0.5 mils to about 5 mils. The thickness of the adhesive layer should, of course, be no thicker than is required for the intended utility. In some instances the thickness will be in the micron range whereas for other purposes the thickness may be in the range a fraction of a mil to more than 1 mil.

The layers which comprise the laminate of the present invention can be assembled in a variety of ways. For example, the combination adhesive, styrene-butadiene block copolymer mixed with the random terpolymer, can be deposited on the PAN film out of a suitable solution, e.g., a toluene solution. Thereafter a second PAN film can be brought into interfacial lamination with the adhesive film and this contact can be facilitated by the appropriate use of pressure and/or heat. Alternatively, the two PAN films can be separately covered or coated with the adhesive and then brought together by the use of pressure and/or heat. When the second layer to be laminated is a thermoplastic film of the type described above, the combination adhesive can be applied to this layer out of a solvent solution and the PAN film can, in any appropriate manner, be brought into intimate interfacial contact with the appropriate use of pressure and/or heat.

After the layers of the present invention have been laminated together, they can be fashioned into an appropriate container. For example, they can be fabricated into retortable pouches employing known methods. In accordance with one such procedure, the laminate can be folded over upon itself with the heat-sealable polyolefin sides facing each other and these faces can be edged sealed between heated plates. Such a pouch can be filled with food or other material, the top heat sealed and an effective retortable pouch is obtained. In the instance, where two laminated polyacrylonitrile films are employed, the edge sealing can be accomplished by use of the adhesive of the present invention since the polyacrylonitrile surfaces cannot be heat sealed together.

EXAMPLE

A strip of corona treated, 3 mil thick film, of a random copolymer of propylene with a minor amount of ethylene (commercially available from Exxon Corporation as EX-24) is coated with a toluene solution containing 25% by weight solids of a combination containing 6 parts by weight of a styrene-butadiene block copolymer and 13 parts by weight of a terpolymer of 34 parts by weight of 1,3-pentadiene, 36.5 parts by weight of beta-phellandrene and 29.5 parts by weight of alpha-methylstyrene. This layer is dried at about 200° F. for about 20 seconds. A corresponding strip of biaxially oriented polyacrylonitrile homopolymer film of approximately 0.65 mil thick is prepared said film containing about 14% by weight of a polyether within the scope of the polyethers defined herein. This polyether is identified as Pluracol® W-660, available from BASF Wyandotte Corporation. This strip is applied to the adhesive coated copolymer of propylene and ethylene. These laminated films are pressed together under moderate pressure at least sufficient to cause a substantially uniform interfacial contact there between. The laminate is then heated at about 250° F. for about 15 seconds. This will yield a laminate which can be peeled apart but only with significant force. The lamination of polyacrylonitrile film not containing the heterized polyether of the present invention to another PAN film, or to a polyolefin film with, the adhesive of the present invention will not result in as strong and effective a laminate as with PAN containing the heterized polyether.

What is claimed is:

1. A flexible film laminate comprising:
   (a) an oriented polyacrylonitrile film containing an adhesion promoting proportion of a liquid heterized ethylene oxide-propylene oxide copolymer prepared by reacting said oxides with at least one monohydric alcohol active hydrogen compound initiator having from about 1 to about 10 aliphatic carbon atoms;
   (b) an adhesive layer contacting said polyacrylonitrile film, said adhesive layer being a combination of (1) a styrene-butadiene block copolymer having a monomer parts by weight ratio of from about 1:3 to about 3:1 and (2) a random terpolymer of from about 30 to about 40 parts by weight of 1,3-pentadiene; about 30 to about 40 parts by weight of a monocyclic terpene and from about 25 to about 35 parts by weight of alpha methylstyrene, said combination consisting essentially of from 1 to about 3 parts by weight of the block copolymer to from about 3 to about 1 part by weight of the terpolymer; and
   (c) a second oriented polyacrylonitrile film or a heat-sealable polyolefin film contacting said adhesive layer.

2. The laminate of claim 1 wherein said polyacrylonitrile contains at least 80% acrylonitrile repeating units.

3. The laminate of claim 1 wherein said polyacrylonitrile is a homopolymer.

4. The laminate of claim 1 in which the adhesive layer contains from about 6 parts by weight of said styrene-butadiene block copolymer and about 13 parts by weight of said terpolymer.

5. The laminate of claim 4 wherein said terpene is beta-phellandrene.

6. The laminate of claim 1 wherein said ethylene oxide-propylene oxide copolymer is water soluble or water miscible and has an average molecular weight of from about 500 to about 5,000 and a Saybolt viscosity at 100° F. of from about 85 to about 5200 seconds.

7. The laminate of claim 6 wherein said monohydric initiator is one or more members selected from the group consisting of methanol, ethanol, proponal and butanol.

8. The laminate of claim 1 wherein said ethylene oxide-propylene oxide copolymer is present in at least 1 weight percent of the polyacrylonitrile film.

9. The laminate of claim 8 wherein said ethylene oxide-propylene copolymer is present in from 5 to about 20 weight percent of the polyacrylonitrile.

10. The laminate of claim 1 wherein said heat-sealable polyolefin film is a homopolymer or a copolymer of a $C_2$-$C_8$ alpha-olefin.

11. The laminate of claim 10 in which the polyolefin film contains up to about 20 weight percent of one or more monomers copolymerizable with the alpha-olefin.

12. The laminate of claim 11 wherein the polyolefin film contains not more than about 5 weight percent of one or more other monomers copolymerizable with the alphaolefin.

13. The laminate of claim 11 where in the polyolefin film is a homopolymer of ethylene or propylene or a copolymer of ethylene and propylene.

14. A process for laminating two or more polyacrylonitrile films or a polyacrylonitrile film and a heat-sealable polyolefin film comprising:
   (a) incorporating into said polyacrylonitrile film an adhesion promoting proportion of a liquid heterized ehtylene oxide-propylene oxide copolymer prepared by reacting said oxides with at least one monohydroxy alcohol active hydrogen compound initiator having from 1 to about 10 atoms;
   (b) interposing between said films a layer of an adhesive composition comprising a combination of (1) a styrene-butadiene block copolymer having a monomer parts by weight ratio of from about 1:3 to about 3:1 and (2) a random terpolymer of from about 30 to about 40 parts by weight of 1,3-pentadiene, about 30 to about 40 parts by weight of a monocyclic terpene; and from about 25 to about 35 parts by weight of alpha methylstyrene, said combination consisting essentially of from about 1 to about 3 parts by weight of the block copolymer to from about 3 to about 1 part by weight of the terpolymer; and
   (c) applying presure or pressure and heat to the film surfaces.

15. The process of claim 14 wherein said pressure is at least sufficient to form intimate interfacial contact between said films and said adhesive composition.

16. The process of claim 14 wherein said adhesive composition is applied to one or both films from a solvent solution of dispersion thereof, the solvent evaporated, interfacial contact made and the laminate subjected to heat assisted bonding.

17. A product pouch or tube fabricated from the flexible film laminate of claim 1.

* * * * *